United States Patent
Zhao et al.

(10) Patent No.: US 7,194,463 B2
(45) Date of Patent: Mar. 20, 2007

(54) SYSTEMS AND METHODS FOR CONSTRAINED ANISOTROPIC DIFFUSION ROUTING WITHIN AN AD HOC NETWORK

(75) Inventors: Feng Zhao, Campbell, CA (US); Horst W. Haussecker, Palo Alto, CA (US)

(73) Assignee: Xerox Corporation, Stamford, CT (US)

( * ) Notice: Subject to any disclaimer, the term of this patent is extended or adjusted under 35 U.S.C. 154(b) by 506 days.

(21) Appl. No.: 10/446,115

(22) Filed: May 28, 2003

(65) Prior Publication Data

US 2004/0010492 A1 Jan. 15, 2004

Related U.S. Application Data

(60) Provisional application No. 60/383,916, filed on May 28, 2002.

(51) Int. Cl.
*G06F 17/30* (2006.01)
*G06F 11/00* (2006.01)
(52) U.S. Cl. .................. 707/5; 707/3; 370/238
(58) Field of Classification Search ........... 707/1–10, 707/100–104.1, 200–205
See application file for complete search history.

(56) References Cited

U.S. PATENT DOCUMENTS

| 6,078,963 A | * | 6/2000 | Civanlar et al. | 709/238 |
| 6,363,319 B1 | * | 3/2002 | Hsu | 701/202 |
| 6,421,354 B1 | * | 7/2002 | Godlewski | 370/466 |
| 2005/0036460 A1 | * | 2/2005 | Dougherty et al. | 370/328 |

\* cited by examiner

*Primary Examiner*—Mohammad Ali
*Assistant Examiner*—Navneet K Ahluwalia
(74) *Attorney, Agent, or Firm*—Oliff & Berridge, PLC

(57) ABSTRACT

This invention describes methods and systems for tasking nodes in a distributed ad hoc network. A node is selected to participate in a data gathering or a routing task based on its potential contribution to information gain and the cost associated with performing the task such as communication bandwidth usage. This invention describes methods and systems for implementing various selection strategies at each node, using local knowledge about the network. For resource-limited sensor networks, the information-driven data gathering and routing strategies significantly improve the scalability and quality of sensing systems, while minimizing resource cost.

25 Claims, 7 Drawing Sheets

SYSTEMS AND METHODS FOR CONSTRAINED ANISOTROPIC DIFFUSION ROUTING WITHIN AN AD HOC NETWORK

This application claims priority under 35 U.S.C. §119 of U.S. Provisional Application No. 60/383,916, filed May 28, 2002, which is incorporated herein by reference in its entirety.

This invention was made with government support under Contract No. F30602-00-C-0139 awarded by Defense Advanced Research Projects Agency (DARPA) through the U.S. Air Force. The Government has certain rights in the invention.

BACKGROUND OF THE INVENTION

1. Field of Invention

This invention relates to methods and systems for routing queries and responses within an ad hoc network.

2. Description of Related Art

Networked sensors are widely used in various applications. For example, tiny inexpensive sensors can be distributed onto, or installed within, roads, walls, or machines to monitor and detect a variety of interesting events, such as highway traffic, wildlife habitat conditions, forest fires, materials and/or process flows in manufacturing jobs, and military battlefield situations.

Because of the spatial coverage and of the multiplicity in sensing aspect and modality that distributed sensors can provide, a sensor network is ideally suited for checking moving phenomena, such as moving vehicles or people, that traverse the range of many sensors in a large area, for monitoring a large number of objects or events simultaneously, such as, for example, forest fires or large animal herds, and/or for detecting low-observable events, such as stealthy, low-signal-to-noise-ratio sources, that may be subject to loud distracters or other counter-measures.

Detecting, classifying and tracking moving non-local, low-observable events require non-local collaboration among sensors of a sensor network. Aggregating sensor data from a multitude of sensors can improve accuracy. However, the data bandwidth and power available to individual sensors in a sensor network is typically constrained. Informed selective collaboration of sensors, in contrast to flooding data requests to all sensors, can reduce latency. Moreover, sensor collaboration can minimize bandwidth consumption, which leads to energy savings, and which mitigates the effect of network node/link failures. Because most inexpensive, distributed sensors are untethered and battery-powered, the longevity of a network depends on the rate the power is consumed when performing computation and communication tasks.

SUMMARY OF THE INVENTION

Blindly combining data from each sensor in an ad hoc network is prohibitively expensive, since bandwidth and battery power are limited in such distributed sensor networks. Therefore, one of the central issues for collaborative signal and information process (CSIP) is energy constrained dynamic sensor collaboration. The inventors have determined that this involves how to dynamically determine which sensor should sense, what physical phenomena needs to be sensed, and which sensor the information must be passed to.

For non-local spatial-temporal sensor events that occur due to motion of one or more targets or to the spatial multiplicity of the targets, sensor collaboration can dynamically invoke regions of the sensor network informed by motion prediction, as in tracking, or activate sensors around a given sensor where there has been a significant change in physical measurements, as in large-scale event monitoring, such as waking up sensors that are on the boundary of a forest fire. For low observable events, sensor collaboration can selectively aggregate multiple sources of information to improve detection accuracy, or to actively probe certain nodes in order to disambiguate multiple interpretations of an event.

For a distributed sensor network to use sensor collaboration, there is a wide range of distributed detection, classification and monitoring problems that should be resolved. Improvements are needed in areas such as detection quality, tracking quality, scalability, survivability and resource usage. Improvements in detection quality can include improvements in one or more of detection resolution, sensitivity, dynamic range, misses, false alarms, and response latency. Improvements in tracking quality can include improvements in one or more of track direction, track length, and robustness against sensing gaps. Improvements in scalability can include improvements in one or more of network size, number of events and number of active queries. Improvements in survivability can include improvements in robustness against node/link failures. Improvements in resource usage can include improvements in one or more of power and bandwidth consumption.

The inventors have determined that not all sensors in a sensor system provide useful information. For example, some sensors are useful, but redundant. When making a local decision in an ad hoc network about a data gathering or routing path to be used, the factors to be considered include information gain and resource cost. Thus, the inventors have determined that systems and methods that balance or trade between maximum information gain and minimum resource cost are desirable.

This invention provides systems and methods that evaluate an objection function locally during data gathering or routing.

This invention separately provides systems and methods that route data in a sensor network using information-directed anisotropic data diffusion routing.

This invention separately provides systems and methods that use an objective function, expressed as a combination of information gain and cost of processing and communication, to direct routing paths in diffusion routing.

This invention separately provides systems and methods that route data in a sensor network with improved scalability.

This invention separately provides systems and methods that route data in a sensor network with improved energy efficiency.

This invention separately provides systems and methods that route data in a sensor network with reduced latency.

This invention separately provides systems and methods that route data in a sensor network using adaptive resource allocation.

This invention separately provides systems and methods that route data in a sensor network that progressively improves detection and/or classification accuracy.

This invention separately provides systems and methods that implement graceful degradation in the presence of link/node failure.

This invention separately provides systems and methods that transmit a compact representation of a current belief state, together with a query, between nodes of the sensor network.

This invention separately provides systems and methods that incrementally update information while the information is passed from one node to another along a routing path.

This invention separately provides systems and methods that implement local decisions and allow data routing to scale to large numbers of nodes without the need for global knowledge about the positions of the nodes.

The invention separately provides systems and methods that implement an objective function that can adapt to a current application need to enable dynamic data routing in an energy optimal, application aware fashion.

This invention separately provides systems and methods that dynamically route data guided by optimality gradients.

This invention separately provides systems and methods that allow sensor data to be combined incrementally to form compact description of a phenomenon that is monitored and tracked.

This invention separately provides systems and methods that dynamically route data to allow a network to predict where new events of interest will be.

This invention additionally provides systems and methods that direct routing towards predicted locations.

This invention additionally provides systems and methods that incorporate the selection of the next sensor based on the distance between a current sensor and the next sensor.

This invention additionally provides systems and methods that incorporate the selection of the next sensor based on the direction from the current sensor to the next sensor.

This invention additionally provides systems and methods that incorporate the selection of the next sensor based on energy consumption criteria.

Various exemplary embodiments of the methods and systems according to this invention allow a current node to locally select a next node based on a balance between an ability of the next node to perform a task and a cost for the next node to perform that task. In various exemplary embodiments, an objective function trades off between the ability and the cost.

Various exemplary embodiments of the methods and systems according to this invention allow reduced energy consumption in data routing. In various exemplary embodiments, a composite objective function contains an information utility term and an energy conservation term. The relative weight of these two terms quantifies a trade-off between maximum information gain and minimal energy costs. The information utility function qualifies the quality of the information conditioned on a gain in accuracy. In various exemplary embodiments, this invention provides systems and methods that select a set of nodes for an incremental update of these two terms at any step.

Various exemplary embodiments of the methods and systems according to this invention allow a sensor query generated from a querying sensor to be broadcast through a network. The query carries a compact representation of a belief state that allows sensors along a query path to locally evaluate the objective function and to incrementally update the belief state. This local information is used to direct data routing according to a gradient descent of the objective function.

Various exemplary embodiments of the methods and systems according to this invention allow information flow to be directed by local information. The information flow is automatically guided towards regions of high information content and is able to establish near optimal or desirable routing paths. Only those sensors that provide useful information are selected and included in the routing path.

Various exemplary embodiments of the methods and systems according to this invention allow the selection of sensors based upon the gain in information and the associated energy cost. An in-network processing of the routing algorithm incrementally updates the belief state along the routing path. In various exemplary embodiments, the in-network processing also sends updated estimates back to the querying sensor. This process continues until a termination accuracy is reached.

Various exemplary embodiments of the methods and systems according to this invention allow the mapping of an estimation uncertainty, as well as an information gain, onto geometric characterizations. When an estimation task is a position estimation of a target, the information gain is related to a decrease in the geometric characterization of estimation uncertainty. Sensor positions allow identifying the potential usefulness of the corresponding sensor measurements. In various exemplary embodiments, the estimation uncertainty is associated with a geometric volume enclosed by an ellipsoid.

Various exemplary embodiments of the methods and systems according to this invention allow the tasking of nodes in a distributed ad hoc network. A node is selected to participate in a data gathering or a routing task based on its potential contribution to information gain and the cost associated with performing the task such as communication bandwidth usage. Various selection strategies are implemented at each node, using local knowledge about the network. For resource-limited sensor networks, the information-driven data gathering and routing strategies significantly improve the scalability and quality of sensing systems, while minimizing resource cost.

These and other features and advantages of this invention are described in, or are apparent from, the following detailed description of various exemplary embodiments of the methods and systems according to this invention.

BRIEF DESCRIPTION OF THE DRAWINGS

Various exemplary embodiments of the methods and systems of this invention will be described in detail, with reference to the following figures, wherein.

DETAILED DESCRIPTION OF EXEMPLARY EMBODIMENTS

Figure 1:
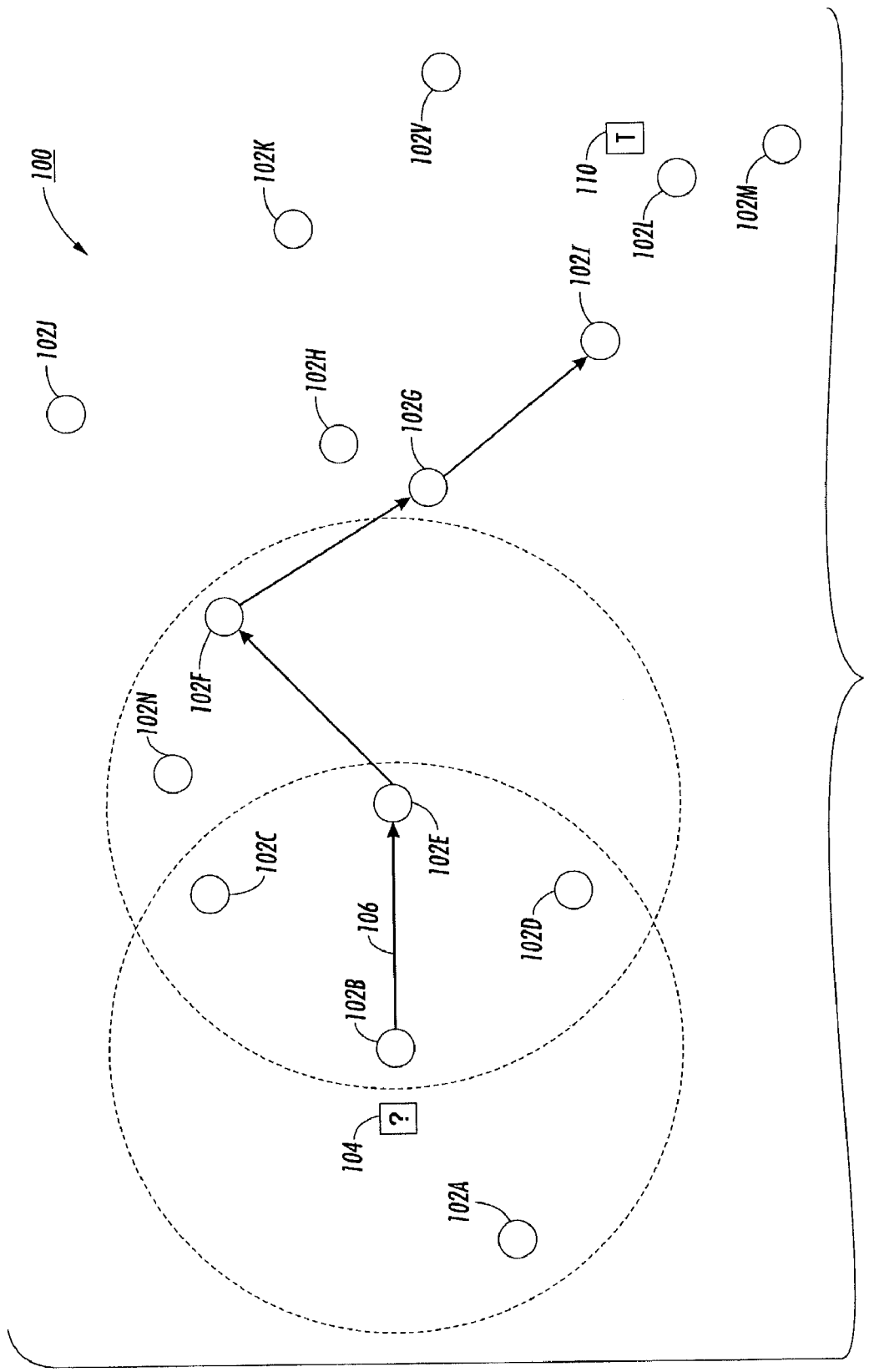
FIG. 1 illustrates one exemplary embodiment of a constrained anisotropic diffusion routing framework according to this invention.

FIG. 1 illustrates an exemplary embodiment of a network for constrained anisotropic diffusion routing according to this invention. As shown in FIG. 1, network 100 comprises a plurality of nodes 102A, 102B, 102C . . . 102V . . . . In various exemplary embodiments, each node comprises one or more sensing devices, one or more microprocessors, one or more storage devices, and one or more communication links.

In various exemplary embodiments of the systems and methods according to this invention, the nodes 102 are sensors and the network 100 is a sensor network. Without causing confusion in terminology, "node" and "sensor" are used interchangeably in the following context when describing a sensor network. In various exemplary embodiments, at least some of the sensors include a microphone measuring acoustic signals. In various other exemplary embodiments, at least some of the sensors include a thermometer measuring temperature. In various other exemplary embodiments, the sensors are cameras. In various other exemplary embodiments, the sensors are sensing devices that detect signals such as vibration signals, light signals, image signals, magnetic signals, infra-red signals, or any of chemical or biological signals. In various other exemplary embodiments, at least some of the sensors comprise a variety of types of measuring devices, such as microphones, thermometers, cameras, vibration sensors, photo cells, magnetomers, infrared sensors, chemical sensors, biological sensors, or any of the devices that measure the above listed phenomena.

In various exemplary embodiments, the nodes 102 are connected wirelessly. In various other exemplary embodiments, the nodes 102 are connected by wire lines. In various other exemplary embodiments, some of the nodes 102 are connected wirelessly while other ones of the nodes 102 are connected by the wire lines.

In various exemplary embodiments, at least one of the nodes 102 is stationary. In various other exemplary embodiments, at least one of the nodes 102 is moving.

A querying node 102B sends a query 104 regarding a target 110, as shown in FIG. 1. In various exemplary embodiments, the target 110 is stationary. In various other exemplary embodiments, the target 110 is moving. In various exemplary embodiments, the target 110 is an object. In various other exemplary embodiments, the target 110 is an event.

In various exemplary embodiments, the query specifies a task of detecting the position of the target 110. In various other exemplary embodiments, the query specifies a task of classifying the target 110.

The query 104 is transmitted, along a path 106, to a node 102E as a current node. The query 104 is transmitted to the current node 102E along with a belief state. In various exemplary embodiments, the belief state is a description of the physical phenomenon being monitored. In various exemplary embodiments, the belief state includes probability density functions of target locations and mean/covariance of a location estimate. In the example shown in FIG. 1, the query 104 is transmitted to the current node 102E along with a belief state that includes information about the target 110 that has been gathered, and is known to the node 102B, before the query 104 is sent to the current node 102E. In various exemplary embodiments, the path 106 is part of a data routing path that includes a sequence of data path nodes.

The current node 102E updates the received belief state using the data at the node, and makes the new belief state as its belief state. 102E selects a next node (or a continuing node) 102F using the belief state. As will be discussed in greater detail below, the next node 102F is selected based on a trade-off between the ability of the next node 102F to perform the task specified in the query 104, such as, for example, further passing the query 104 to a subsequent next 102L that is in proximity of the target 110, as well as the cost associated with performing this task by the next node 102F. The current node 102E sends the belief state, along with the query 104, to the next node 102F as a new current node. The new current node 102F then again updates the belief state and continues forwarding the query 104 to a subsequent next node 102 based on the selection criterion applied to subsequent nodes.

The current node 102E sends a report regarding the updated belief state and the selection of the next node 102F back to the querying node 102B. Thus, in the case of a link/node failure, the network 100 achieves a graceful degradation by retaining the information regarding at least a part of the path between the querying node 102B and the target 110.

In various exemplary embodiments, the network 100 performs multiple queries simultaneously. In various exemplary embodiments of the methods and systems of this invention, different queries are sent simultaneously to different portions of the network 100. In various other exemplary embodiments of the methods and systems according to this invention, different queries are sent simultaneously to different types of sensors in the network 100.

In various exemplary embodiments, the current node 102E selects the next node 102F locally using an in-network processing, without the need for global knowledge regarding the positions of all nodes. This local selection makes the system scalable to large-scale networks. By using local selection and belief state updating, such exemplary embodiments of the systems and methods according to this invention achieve adaptive resource allocation and progressive accuracy in detection and classification tasks.

When selecting a next node that a query will be passed to, the current node 102E analyzes a subset of nodes. In various exemplary embodiments, the subset of nodes includes nodes whose information is made available to the current node, regardless of their distance from the current node. In various other exemplary embodiments, the subset of nodes includes neighboring nodes of the current node. In some of those exemplary embodiments, a specified range is used to define the neighboring nodes of the current node. In the exemplary embodiment shown in FIG. 1, the nodes 102B, 102C, 102D, 102F and 102N are within the specified range of the node 102E, while the nodes 102G and 102H are outside the specified range. Thus, the neighboring nodes of the current node 102E include nodes 102B, 102C, 102D, 102F and 102N but not 102G or 102H.

The specified range is defined based on a distance between the current node 102E and another node. In various exemplary embodiments, the distance is a spatial distance. In various other exemplary embodiments, the distance is a feature distance, such as a communication distance. In various other exemplary embodiments, the distance is an arbitrary distance depending on the type of the nodes.

In one exemplary embodiment, the current node 102E only analyzes "unread" nodes among the neighboring nodes, and does not analyze "read" nodes. The "read" nodes, or queried nodes, are those nodes whose data has already been incorporated in the belief state before the query 104 reaches the current node 102E. On the other hand, the "unread" nodes, or unqueried nodes, are those nodes whose data has not been incorporated so far.

In various exemplary embodiments, the information regarding the neighboring nodes that have been queried is contained in the belief state transmitted to the current node 102E with the query 104. In one exemplary embodiment, the nodes 102B, 102C and 102D were queried by the node 102B when determining which node 102 would be the next node on the path 106. Thus, these nodes have already been incorporated. Thus, the "read" neighboring nodes of the current node 102E include the nodes 102B, 102C and 102D. However, in another exemplary embodiment, the nodes 102C and 102D were considered, but not communicated with, when generating the path 106 of the query 104 to the current node 102E. The read neighboring nodes thus include the node 102B only.

Thus, in the exemplary embodiment shown in FIG. 1, the current node 102E only needs to analyze the nodes 102F and 102N, the only two unread neighboring nodes. The current node 102E selects a next node from the nodes 102F and 102N to carry on the query. The selection of the next node is based on the belief state and an objective function that trades off between maximum information gain and minimal cost, as discussed in greater detail below.

In various exemplary embodiments, the belief state is represented by a triplet:

$$\{\vec{x}_T, \vec{x}_S, \Sigma\}, \quad (1)$$

where:

$x_T$ is a vector indicating an estimated position of the target 110;

$x_S$ is a vector indicating the position of the current node 102E; and $\Sigma$ is a residue uncertainty indicating an uncertainty of the estimated position of the target 110.

In various exemplary embodiments, the residue uncertainty is calculated at a prior node before the query reaches the current node 102E, and updated by node 102E. The current node 102E selects a next node such that this updated residue uncertainty can be reduced. The information utility of the next node is calculated based on a covariance matrix, using a Mahalanobis distance, which incorporates both the length and shape of a distance in a feature space. A detailed discussion of the calculation of the information utility may be found in "Scalable Information-Driven Sensor Querying and Routing for ad hoc Heterogeneous Sensor Networks," by Chu et al., *International Journal of High Performance Computing Applications*, 2002, which is incorporated herein by reference in its entirety.

In various exemplary embodiments, the belief state is determined based on a representation of a current a posterior distribution of a current sensor at sensor position x:

$$p(x|Z_1, \ldots Z_n), \quad (2)$$

where $Z_1, \ldots Z_n$ are measurements that have been made along the query path before the query path reaches the current sensor.

In various exemplary embodiments, the expectation of the distribution in Eq. (2) is determined as:

$$\bar{x} = \int x p(x|Z_1, \ldots, Z_n) dx. \quad (3)$$

In various exemplary embodiments, the expectation determined by Eq. 3 is considered an estimate, such as the Minimal Mean Square Estimate or Least Square Estimate. In one exemplary embodiment, the residual uncertainty is approximated by the covariance:

$$\Sigma = \int (x-\bar{x})(x-\bar{x})^T p(x|Z_1, \ldots, Z_n) dx, \quad (4)$$

where $(x-\bar{x})^T$ represents the difference between the target position and the expectation.

In various exemplary embodiments, selecting a next node from a plurality of neighboring nodes considers the information content of the neighboring nodes. The information content includes measurements that can be made at that neighboring node. In one exemplary embodiment, a time-dependent measurement of a neighboring sensor is determined as:

$$Z_i(t) = h(x(t), \lambda_i(t)), \quad (5)$$

wherein:

t represents time;

i is an index of a neighboring sensor;

x(t) represents a parameter, such as the unknown target position, that is to be estimated from the measurements;

$\lambda_i(t)$ represents characteristics of sensor i; and

In various exemplary embodiments, the characteristics $\lambda_i(t)$ about the $i^{th}$ sensor include sensing modality (for example, sensor type), sensor position, and other parameters, such as the noise model of sensor i and node power reserve.

In various exemplary embodiments, all nodes in a sensor network are acoustic sensors measuring only the amplitude of a sound signal.

For acoustic sensors, the parameters x is expressed as:

$$x = [y_1, y_2]^T \quad (6)$$

where $[y_1, y_2]^T$ is the unknown target position.

The characteristics of acoustic sensors can be expressed as:

$$\lambda_i = [x_i, \alpha_i^2]^T, \quad (7)$$

where:

$x_i$ is the position of a neighboring sensor; and $\alpha_i^2$ is a known additive noise variance.

In one exemplary embodiment, the acoustic signals propagate isotropically. The measurements made by the acoustic sensors can be determined by:

$$Z_i = \frac{a}{\|x_i - x\|^{\beta/2}} + w_i \quad (8)$$

where:

a is the source amplitude at the target;

$\beta$ is a known attenuation coefficient;

$\|\cdot\|$ is the Euclidean norm; and $w_i$ is a zero mean Gaussian random variable with variance $\sigma_i^2$ In various exemplary embodiments, the information content of a neighboring node is determined based on an information utility function $\psi$:

$$\psi : P(R^d) \to R, \quad (9)$$

where:
$R^d$ is the parameter space for the belief state; and
P is a class probability distribution on $R^d$.

In various exemplary embodiments, the information utility function $\psi$ assigns a value to each probability distribution. This value indicates how spread-out or uncertain the distribution P is. Smaller values represent a more spread-out distribution, while larger values represent a tighter distribution.

In various exemplary embodiments, a new measurement $Z_j$ is incorporated into the current belief p to update the belief into:

$$p(x|\{Z_i\}_{i \in U} \cup \{Z_j\}), \quad (10)$$

where union operation u includes indices 1-i, but not index j. The best choice for the next sensor:

$$j \in A = \{1, \ldots, N\} - U, \quad (11)$$

where:

$$U \subset \{1, \ldots N\}, \quad (12)$$

is determined as:

$$j = \arg_{j \in A} \max \psi(p(x|\{Z_i\}_{i \in U} \cup \{Z_j\})). \quad (13)$$

In various exemplary embodiments, the information utility function $\psi$ evaluates the compactness of the belief state distribution, as discussed in greater detail below. In some such exemplary embodiments, the information utility function $\psi$ evaluates the compactness of the belief state distribution based on measures on the expected posterior distribution, as discussed above in connection with Eqs. (2)–(4).

In some such exemplary embodiments, the information utility function $\psi$ evaluates the compactness of the belief state distribution based on an entropy. The entropy measures the randomness of a give random variable. The smaller the value of the entropy, the more certain the random variable. In various exemplary embodiments, a discrete random variable x is used. Accordingly, the entropy is expressed as:

$$H_p(x) = -\sum_{x \in S} p(x) \log p(x), \quad (14)$$

where S denotes a support of the random variable.

In various exemplary embodiments, a continuous random variable x is used. Accordingly, the entropy is expressed as:

$$H_p(x) = -\int_S p(x) \log p(x) dx. \quad (15)$$

In various exemplary embodiments, the information utility function $\psi$ is defined based on the entropy expressed in Eqs. (14) and (15) as:

$$\psi(p(x|\{Z_i\}_{i \in U} \cup \{Z_j\})) = -H_p(x). \quad (16)$$

In some other such exemplary embodiments, the information utility function $\psi$ evaluates the compactness of the belief state distribution based on Mahalanobis distance measures. A Mahalanobis measurement includes a Mahalanobis distance that incorporates both the length and the shape of a distance in a feature space. When the current belief state can be well approximated by a Gaussian distribution, the information utility function can be expressed as a function of covariance and mean of the belief:

$$\psi(x_j, \vec{x}_T, \hat{\Sigma}) = -(x_j - \vec{x}_T)^T \hat{\Sigma}^{-1} (x_j - \vec{x}_T), \quad (17)$$

where:
$x_j$ is the position of a sensor j;
$\vec{x}_T$ is the mean of the belief (which in this example is the target position estimate); and $\hat{\Sigma}$ is the covariance of the belief.

Figure 2:
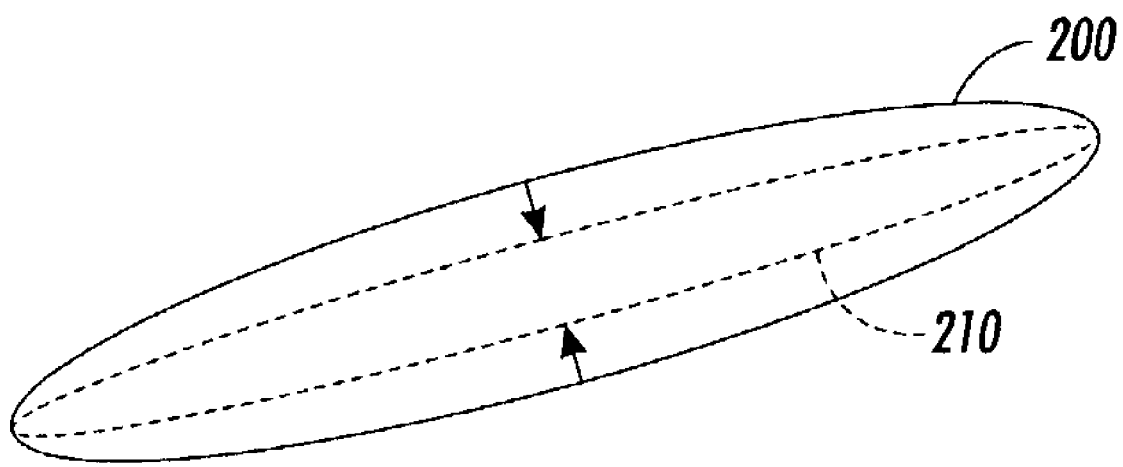
FIG. 2 illustrates one exemplary embodiment of an uncertainty ellipsoid in the state space indicating a belief state according to this invention.
Figure 3:
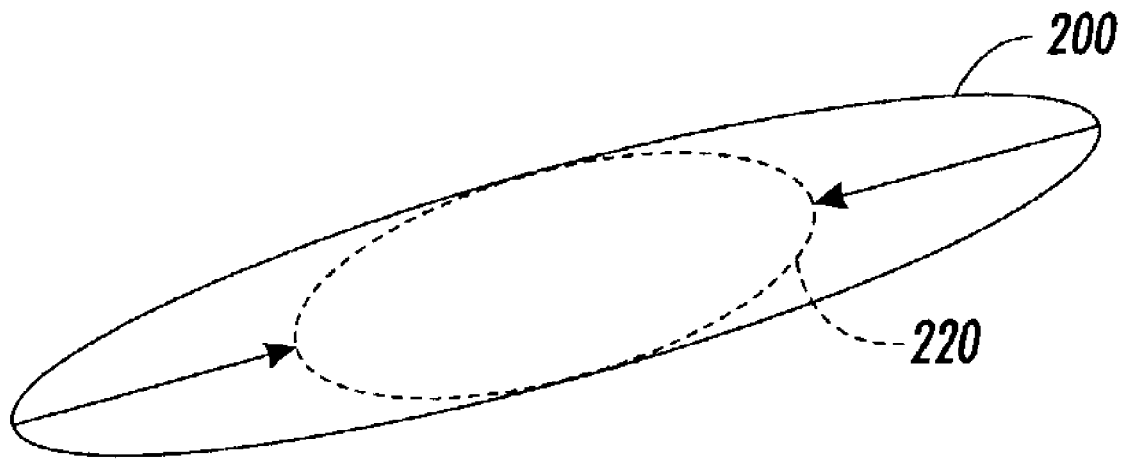
FIG. 3 illustrates another exemplary embodiment of an uncertainty ellipsoid in the state space indicating another belief state according to this invention.

FIGS. 2 and 3 illustrate exemplary reduction of the residue uncertainty. As shown in FIG. 2, the residue uncertainty 200 represented by the solid ellipse is the residue uncertainty contained in the belief state. The shape and size of the reside uncertainty 200 are provided in the triplet in Eq. (1). The area enclosed in the ellipse represents the magnitude of the residue uncertainty. A larger area represents a more spread-out uncertainty, while a smaller area indicates a "tighter" uncertainty. In various exemplary embodiments, a next node is selected to reduce the size of the ellipse.

The ellipse 210 represents the residue uncertainty that would result if the node 102N is selected as the next node. As shown in FIG. 2, the area enclosed in the ellipse 210 is smaller than that in the ellipse 200. Thus, the residue uncertainty will be reduced when the node 102N is selected.

FIG. 3 shows an ellipse 220 that would result if the node 102F is selected as the next node. As shown in FIG. 3, the residue uncertainty would also be reduced.

In various exemplary embodiments, the current node 102E compares the reduction of the residue uncertainty that would result at the nodes 102F and 102N. The current node 102E considers the node that would result in a greater reduction of residue uncertainty as the node that would result in greater information gain.

In various exemplary embodiments, the current node 102E compares the measures of the new residue uncertainties 210 and 220. The current node 102E considers the node that would result in a smaller residue uncertainly as the node that would result in greater information gain.

Comparing FIGS. 2 and 3, the reduction of the residual uncertainty is substantially the same. Also, the areas encompassed in the elliptical residue uncertainties 210 and 220 are the same. However, the new residue uncertainty 210 in FIG. 2 maintains a larger principle axis of the ellipse. In various exemplary embodiments, the current node 102E considers the node 102N that would result in the new residue uncertainty 210 shown in FIG. 2 as a node that would lead to less information gain. Thus, the node 102F is considered to provide more information gain, because the node 102F would result in an elliptical residue uncertainty 220 that has a smaller principle axis, as shown in FIG. 3.

The determination of the new residue uncertainties that would result from different neighboring nodes is based on the sensor types of the neighboring nodes, the associated signal models and the locations of the neighboring nodes. The sensor types of the neighboring nodes are known to the current node 102E. In various exemplary embodiments, the current node 102E stores the node types of the neighboring nodes.

The signal models associated with the neighboring nodes are also known to the current node 102E. In various exemplary embodiments, the current node 102E stores the signal models associated with the neighboring nodes. In various exemplary embodiments, acoustic signal transmission and noise models are associated with acoustic sensors, such as microphones.

In various exemplary embodiments, the locations of the neighboring nodes are in spatial or geometric spaces. In various other exemplary embodiments, the locations are in feature distances. In various other exemplary embodiments, the locations are in some other feature space, or in an arbitrary space, depending on sensor types.

In various exemplary embodiments, when selecting a next node, the current node 102E uses a composite objective function that assesses information gain and cost and that trades off between maximum information gain and minimal cost. In various exemplary embodiments, the composite objective function is expressed as:

$$H(\vec{x}) = \alpha F_1(\vec{x}, \vec{x}_T, \Sigma) + (1-\alpha) F_2(\vec{x}, \vec{x}_s), \quad (18)$$

where:

H is a composite objective function at a potential next node or a neighboring node with a position described by a vector $\vec{x}$;

$F_1$ is an information utility term that includes a description of information gain;

$F_2$ is a cost conservation term that measures the cost of obtaining information, including link bandwidth, transmission latency, node battery power reserve, and the like;

$\vec{x}_T$ is an estimated position of the target 110;

$\vec{x}_s$ is the position of the current sensor; and $\alpha$ is a weighting parameter that qualifies the relative weights to be given to the information utility term $F_1$ and the cost conservation term $F_2$ in determining the composite objective function H and that takes the value between 0 and 1.

In various exemplary embodiments, the cost reservation term $F_2$ is determined using an Euclidean distance. An example of the Euclidean distance is discussed in "Information Driven Dynamic Sensor Collaboration for Tracking Applications," by Zhao et al., *IEEE Signal Processing Magazine*, March 2002, which herein by reference in its entirety.

In various exemplary embodiments, the objective function H is maximized by selecting a node j from a group of nodes:

$$A = \{1, \ldots N\} - U, \quad (19)$$

where j is determined by:

$$j = arg_{j \in A} \max H(\vec{x}_j). \quad (20)$$

In various exemplary embodiments, a termination criterion, such as the value of a quality parameter, is made known to the current node 102E. In various exemplary embodiments, the quality parameter is stored at the current node 102E. In various other exemplary embodiments, different values for the quality parameter are stored for different node types.

In various exemplary embodiments, a value for the quality parameter is determined based on the accuracy of the information to be gained. Thus, the development of the path from the querying node to the target is terminated once the closeness of the next node with the target is within the required accuracy. In various other exemplary embodiments, the value for the quality parameter is determined based on an optimal requirement. In this case, developing the path from the querying node to the target continues until a next node that is closest to the target is identified.

In various exemplary embodiments, the current node 102E evaluates the objective function H at the positions of the neighboring nodes, and selects the neighboring node that produces a desirable objective function result. In various exemplary embodiments, the desirable result includes a minimal value of the objective function. In various other exemplary embodiments, the desirable result includes a maximum objective function value.

As used herein, the terms "optimize", "optimal" and "optimization" connote a condition where one entity is deemed better than another entity because the difference between the two entities is greater than a desired difference. It should be appreciated that it would always be possible to determine a better entity as the desired difference decreases toward zero. Also, the terms "maximize", "maximum" and "maximization" connote a condition where one entity is deemed greater than another entity because the difference between the two entities is greater than a desired difference. It should be appreciated that it would always be possible to determine a greater entity as the desired difference decreases toward zero. Similarly, the terms "minimize" and "minimal" connote a condition where one entity is deemed less than another entity because the difference between the two entities is greater than a desired difference. Again, it should be appreciated that it would always be possible to determine a lesser entity as the desired difference approaches zero.

Accordingly, it should be appreciated that, these terms are not intended to describe an ultimate or absolute condition. Rather, it should be appreciated that these terms are intended to describe a condition that is relative to a desired level of accuracy represented by the magnitude of the desired difference between two or more entities. In various embodiments of systems and methods according to this invention, when approaching a result that is optimal, it is satisfactory to stop at a result with a desired result, without having to reach a true, mathematically optimal result. In various other embodiments of systems and methods according to this invention, when approaching a maximum result, it is satisfactory to stop at a result with a desired result, without having to reach the true, mathematically maximum result.

In various other exemplary embodiments, the current node 102E selects the next node without global acknowledge of the node positions. The query is directed by local decisions of individual nodes and guided into regions satisfying desired constraints. In various other exemplary embodiments, the current node 102E selects the next node by evaluating the objective function H at the positions of the neighboring nodes, where the neighboring nodes are within a defined distance of the current node 102E. The current node 102E compares the values of the objective functions H at each node in the neighborhood:

$$H(\vec{x}_j), \quad (21)$$

where $j \in \{1, \ldots, m\}$ represents a neighboring node.

The current node 102E selects, as the next node, the node l that maximizes (or minimizes, or optimizes) the objective function locally within the neighborhood:

$$H(\vec{x}_j) \leq H(\vec{x}_l), \quad (22)$$

where $j \in \{1, \ldots, m\} \ldots$

In various exemplary embodiments, the current node 102E selects the next node in the direction of the gradient $\nabla H$ of the objective function H:

$$\nabla H = \left[\frac{\partial H}{\partial x}, \frac{\partial H}{\partial y}\right]^T, \quad (23)$$

where:

$$\frac{\partial H}{\partial x}$$

represents gradient or derivative of H in the direction of the X axis;

$$\frac{\partial H}{\partial y}$$

represents gradient or derivative of H in the direction of Y axis; and

T is the transpose operation.

In various exemplary embodiments, the current node 102E selects, as the next node, the node j such that:

$$\arg_j \max[(\nabla H)^T(\vec{x}_j - \vec{x}_i)/(\|\nabla H\| \|\vec{x}_j - \vec{x}_i\|)], \quad (24)$$

where:

$x_i$ is the current node; and $x_j$ represents a neighboring node.

In various other exemplary embodiments, the current node 102E selects the current globally optimal node by evaluating:

$$\left[\frac{\partial H}{\partial x}, \frac{\partial H}{\partial y}\right]^T = 0, \quad (25)$$

Eq. (25) allows the direction towards the optimum position to be locally determined. In various exemplary embodiments, the current node 102E selects, as the next node, according to a weighted average of the gradient $\nabla H$ of the objective function H and the direct connection between the current node and the optimum position $\vec{x}_m$:

$$\beta(\nabla H) + (1-\beta)(\vec{x}_m - \vec{x}), \quad (26)$$

where β is a function of the distance between the current node and the optimum node position. In various exemplary embodiments, the function β is:

$$\beta = \beta(\|\vec{x}_m - \vec{x}\|). \quad (27)$$

This routing mechanism allows adapting the routing direction to the distance from the optimum position. In various exemplary embodiments, when the distance is small, the gradient of the objective function H is followed for fastest information gain. In various exemplary embodiments, when the distance is large and the objective function H is flat, the node in the direction of the optimal position as determined by eq. (25) is selected as the next node.

The specific method for selecting the next node is made known to the current node 102E. In various exemplary embodiments, the specific method for selecting the next node is stored at the current node 102E. Once the next node is selected, the current node 102E passes the query, along with an updated belief state, to the selected next node and then sends a report to the querying node.

In various exemplary embodiments, in-network processing is performed to establish an optimal routing path towards the potentially best node along which the measurement from the node closest to the optimal position is shipped back to the querying node. This in-network processing provides scalability into larger networks.

In various exemplary embodiments, the estimate and the estimation uncertainty can be dynamically updated along the routing path. In various exemplary embodiments, the objective function H along the routing path monotonically increases. In this case, the information provided by subsequent nodes becomes incrementally better and move towards a global optimum. When the information is continuously shipped back to the querying node, the information arriving in the sequential order provides an incremental improvement to the estimate. This incremental improvement provides for graceful degradation. When a predefined accuracy is reached, the querying node can terminate the query even if the optimal target position has not been reached.

In various exemplary embodiments, a target dynamic model is used to predict the position of a moving target during a local dynamic update of a belief state and the objective function H. The predicted target position and associated uncertainty is used to dynamically aim the information-directed query at subsequent positions to ideally, optimally, or at least with improved accuracy, track the target.

Figure 4:
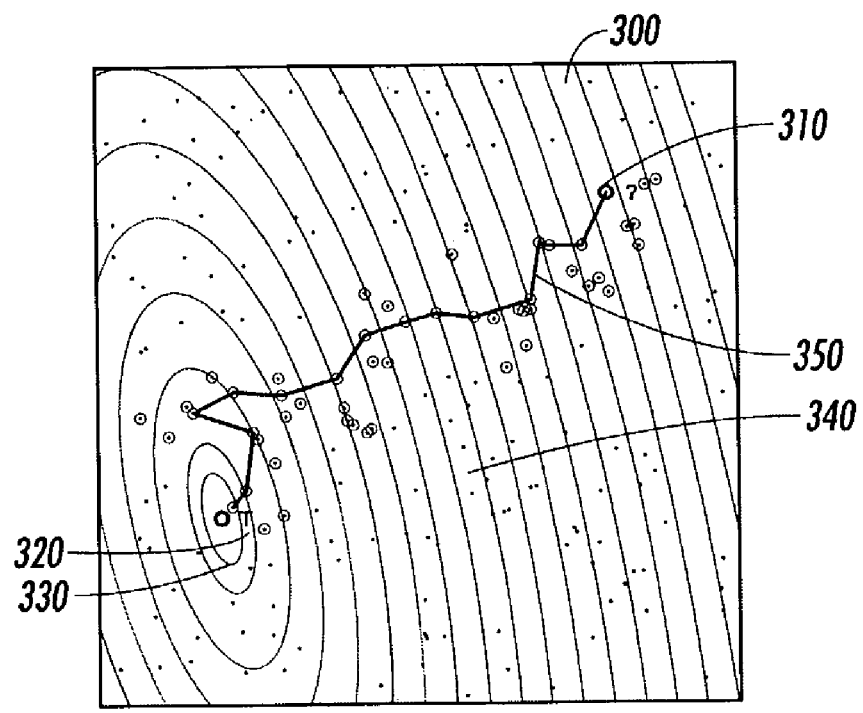
FIG. 4 illustrates a set of concentric ellipses indicating isocontours of a first exemplary embodiment of an objective function according to this invention.
Figure 5:
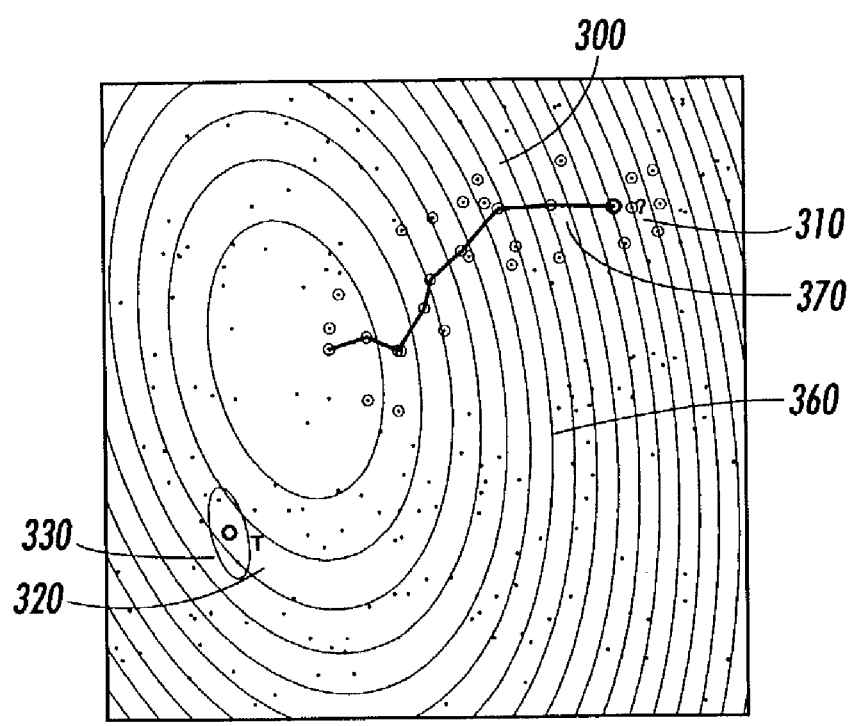
FIG. 5 illustrates a set of concentric ellipses indicating isocontours of a second exemplary embodiment of the objective function according to this invention.
Figure 6:
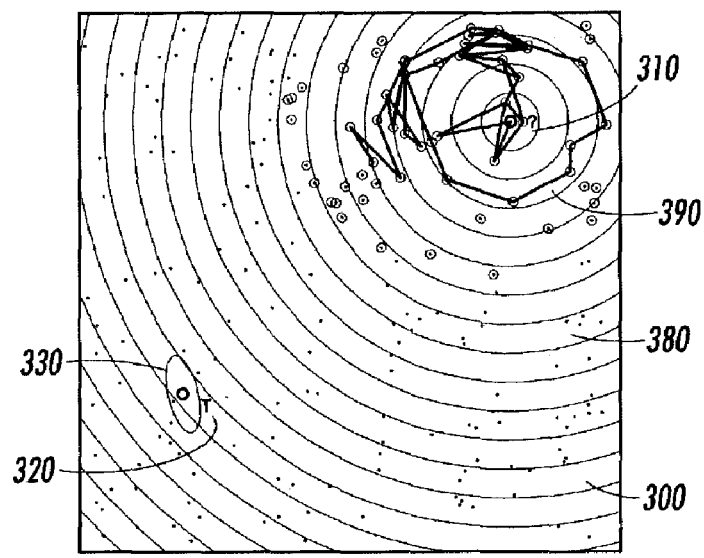
FIG. 6 illustrates a set of concentric ellipses indicating isocontours of a third exemplary embodiment of an objective function according to this invention.

FIGS. 4–6 illustrate how the value of the parameter α influences the selection of the next node, and, therefore, the development of the path from a querying node 310 to a target 320, in a system of sensor nodes 300. For ease of discussion, the residue uncertainty indicated by the ellipse 330 is fixed in FIGS. 4–6.

In FIG. 4, the value of the parameter α is 1. In such a case, the information gain $F_1$ is maximized, ignoring the cost conservation $F_2$. As shown in FIG. 4, the isocontours 340 of the objective function H are centered at the target 320. A path 350 is developed from the query node 310 to the target 320.

In FIG. 5, the value of the parameter α is 0.5. Thus, the objective function H equally balances the information gain and cost. As shown in FIG. 5, the isocontours 360 of the objective function H are centered at a position other than the target 320, as a result of this balancing, and a path 370 is developed from the querying node 310 to the center of the isocontours 360.

In FIG. 6, the value of the parameter α is 0. Thus, the cost function $F_2$ is maximized, ignoring the information gain function $F_1$. As shown in FIG. 6, the isocontours 380 of the objective function H are centered at the querying node 310. The path 390 from the querying sensor 310 has little, if any, tendency to leave the querying node 310.

In a sensor network according to this invention, the number of sensors, that is, the sensor density, affects the shape and length of the routing path. For dense networks, the optimal path between the querying sensor and the estimated target position is more direct through the relatively densely populated sensors. On the other hand, for networks with lower sensor densities, the routing path is likely to take more deviations to hop through the sparsely populated sensors to eventually reach the estimated target position. The impact of the node density on the shape and length of a routing path is illustrated in FIGS. 7–9.

Figure 7:
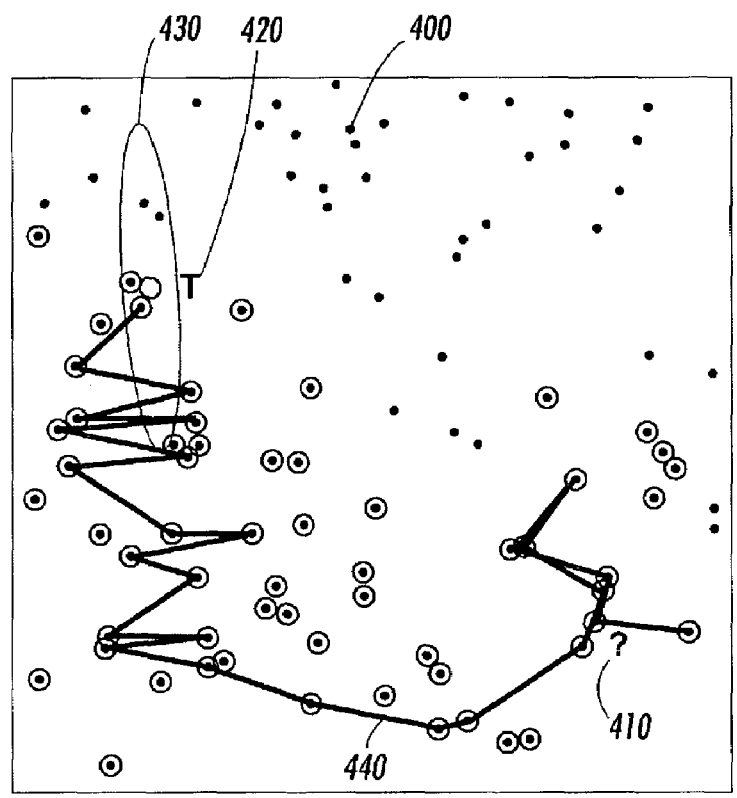
FIG. 7 illustrates a query path of a fourth exemplary embodiment according to this invention.

FIG. 7 illustrates a sensor network having 100 sensors 400. The querying sensor 410 sends a query regarding the target 420 having an ellipse 430. The weighting parameter α is set to 1.0 to ensure a path from the querying sensor 410 to the target 420. As shown in FIG. 7, because the sensor density is low, the path 440 from the querying sensor 410 to the target 420 takes large jumps among the sensors.

Figure 8:
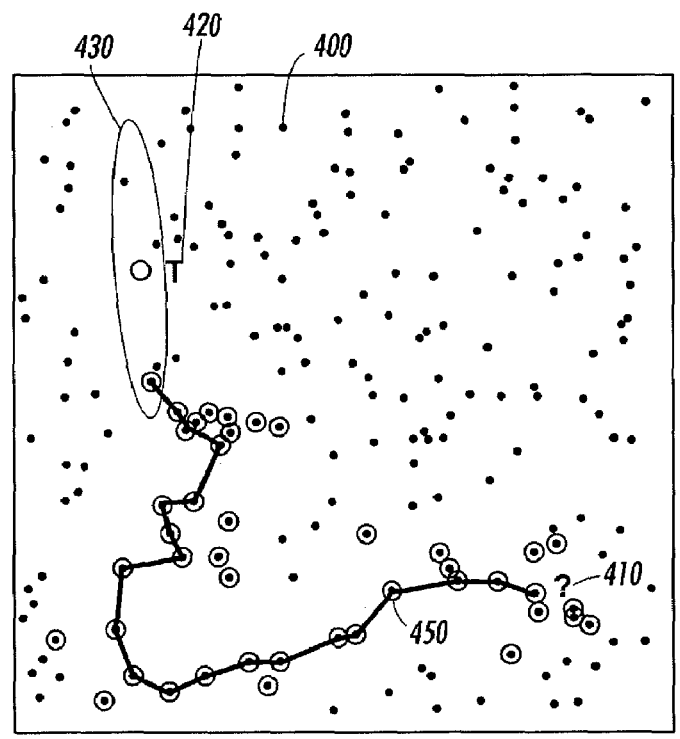
FIG. 8 illustrates a query path of a fifth exemplary embodiment according to this invention.

In FIG. 8, the number of sensors is increased to 200, while the weighting parameter is kept at a value of 1.0. As shown in FIG. 8, because of the increased sensor density, the query path 450 from the querying sensor 410 to the target 420 is smoother, with less huge jumps between sensors.

Figure 9:
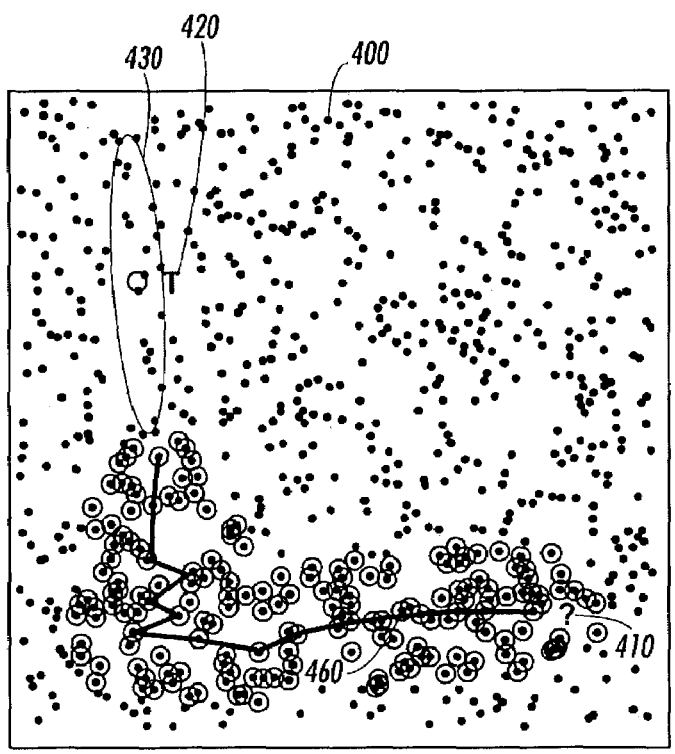
FIG. 9 illustrates a query path of a sixth exemplary embodiment according to this invention.

FIG. 9 illustrates the same sensor network, except that the number of sensors is increased to 800. The weighting parameter α is still kept at a value of 1.0. As shown in FIG. 9, the query path 460 from the querying sensor 410 to the target 400 is further smoothened with fewer deviations.

Figure 10:
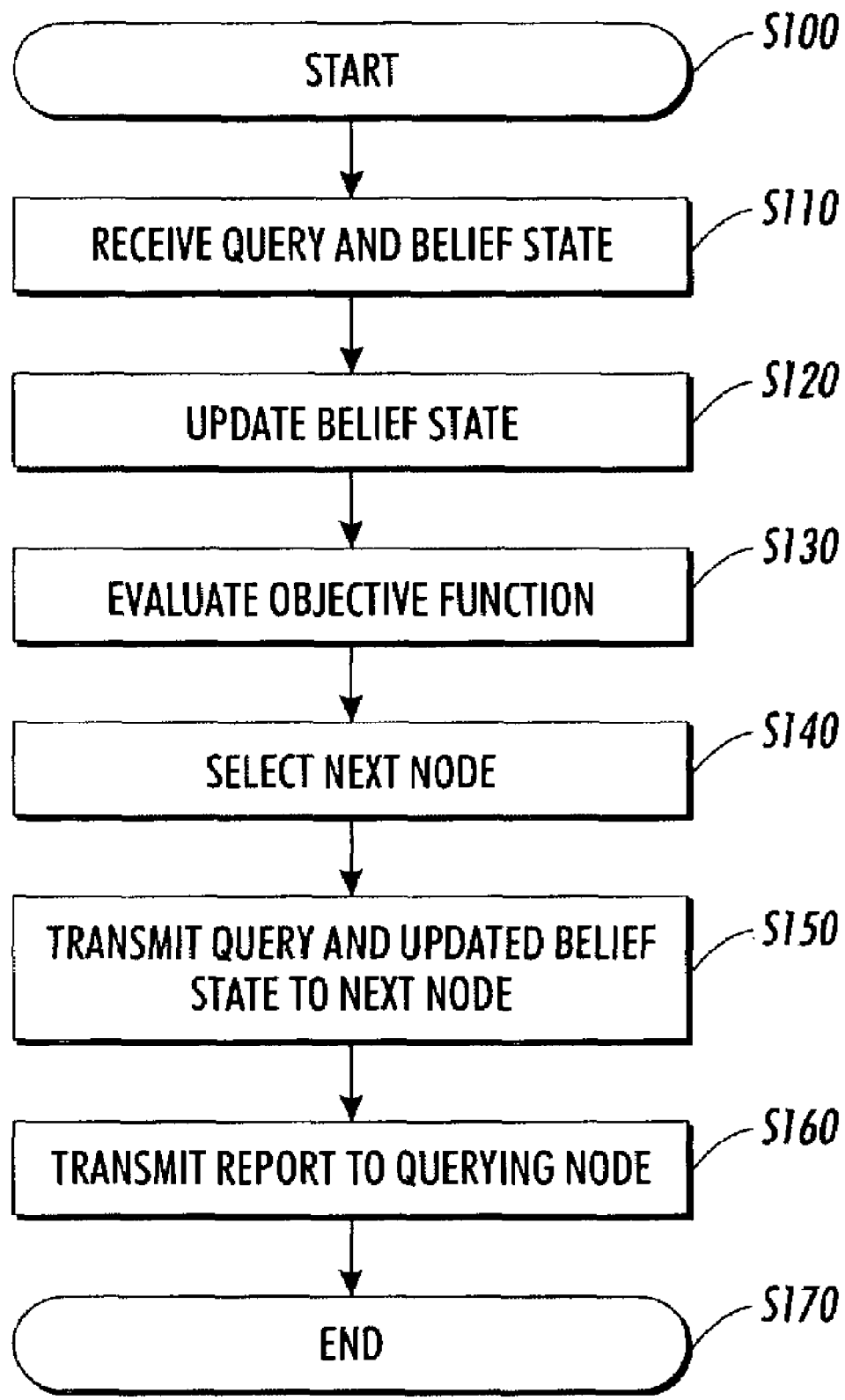
FIG. 10 is a flowchart outlining one exemplary embodiment of a method for selecting a next sensor according to this invention.

FIG. 10 is a flowchart outlining one exemplary embodiment of a method for each node to select a next node according to this invention. As shown in FIG. 10, beginning in step S100, operation continues to step S110, where a current node receives from a querying node a query with a compact representation of a belief state in the form of a triplet that includes a residue uncertainty. Next, in step S120, the current node updates the belief state with information, including a reduced residue uncertainty. Then, in step S130, the current node evaluates the objective function H for one or more neighboring nodes, using information such as sensor types, associated signal models and locations. Then, in step S140, the current node selects a next node that produces a desirable result for the objective function H. Operation then continues to step S150.

In step S150, the current node transmits the query with the updated belief state to the selected next node. Next, in step S160, the current node sends a report regarding the selection of the next node and the updating of the belief state to the querying node. Operation then continues to step S170, where operation of the method ends.

Figure 11:
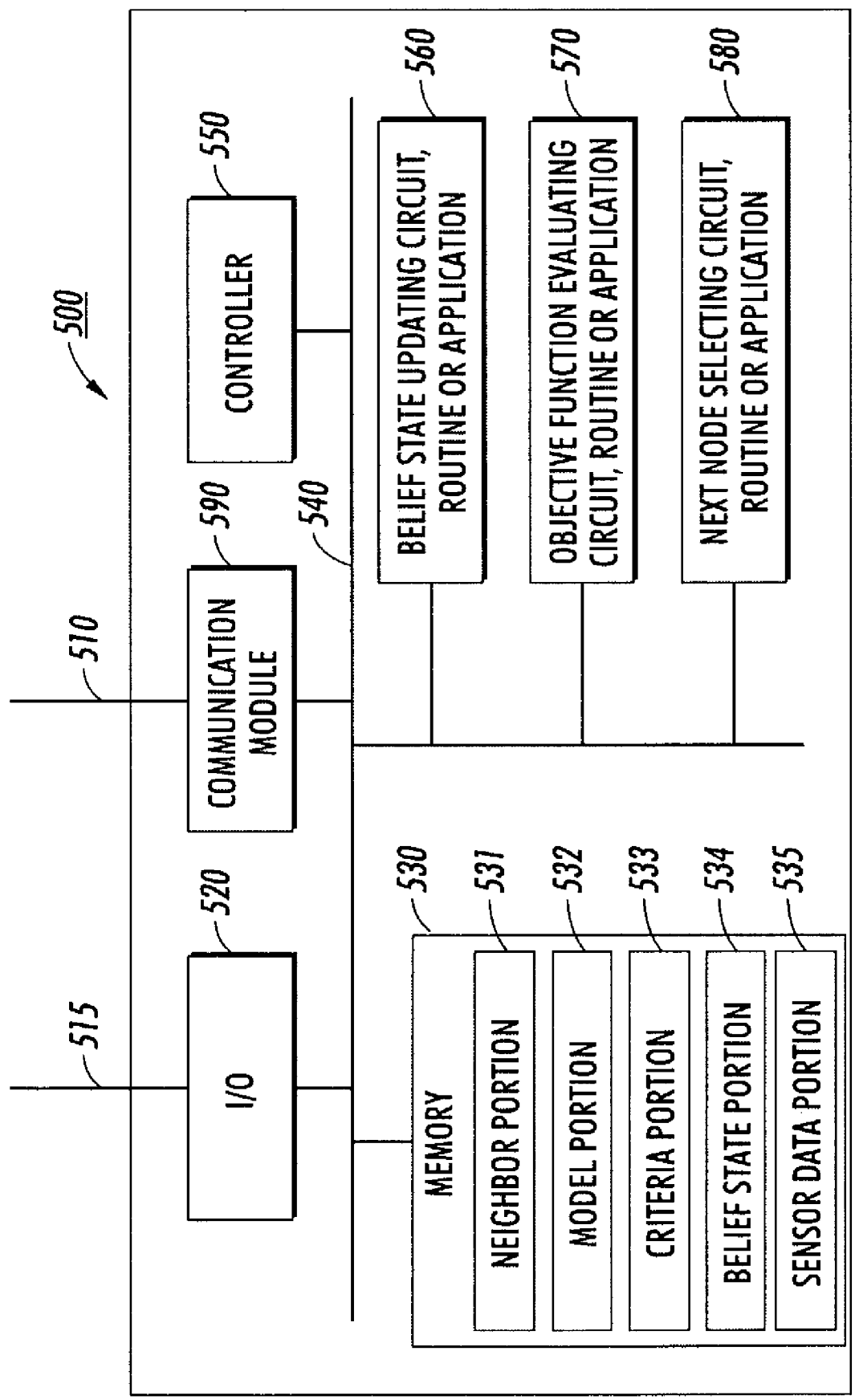
FIG. 11 is a block diagram of one exemplary embodiment of a routing system of a sensor according to this invention.

FIG. 11 is a block diagram illustrating one exemplary embodiment of a selecting system 500 usable in a node of a distributed sensor network according to this invention. As shown in FIG. 11, the selecting system 500 includes one or more of an input/output (I/O) interface 520, a communication module 590, a controller 550, a memory 530, a belief state updating circuit, routine or application 560, an objective function evaluating circuit, routine or application 570, and a next node selecting circuit, routine or application 580, each interconnected by one or more control and/or data busses and/or one or more application programming interfaces 540.

As shown in FIG. 11, the selecting system 500 is, in various exemplary embodiments, implemented using a general purpose computer, a special purpose computer, a programmed microprocessor or microcontroller in peripheral integrated circuit elements, an ASIC or other integrated circuit, a digital signal processor, a hard wired electronic or logic circuit such as a discrete element circuit, a programmable logic device such as a PLD, PLA, FPGA or PAL, or the like. In general, any device, capable of implementing a finite state machine that is in turn capable of implementing the flowchart shown in FIG. 10, can be used to implement the selecting system 500.

The I/O interface 520 connects the selecting system 500 to transducers on a current node. A transducer coverts a physical phenomena such as temperature into an electrical signal that can be further processed by a node. For example, the I/O interface receives sensor information about the environment over a link 515 to one or more transducers on the current node.

The communication module 590 connects the selecting system 500 to the network. For example, the current node obtains information regarding its neighboring sensors through the communication module 590 over a link 510. In another example, the communication module 590 receives a query with a belief state from a querying node over the link 510. The communication module 590 also outputs the query and an updated belief state to a selected next node over the link 510. In various exemplary embodiments, the link 510 is wireless. In various other exemplary embodiments, the link 510 is wired.

The memory 530 stores information received from the communication module 590, such as the belief state, and from the I/O interface 520, such as the sensor information. The memory 530 also stores information and/or data from various ones of the circuits, routines or applications 560–580 of the selecting system 500 during or after intermediate steps of a node selecting process.

As shown in FIG. 11, the memory 530 includes one or more of a neighbor portion 531, which stores neighbor node information; a model portion 532, which stores signal models associated with the neighbor nodes; a criteria portion 533, which stores information related to selecting criteria such as the value of the quality parameter and selection methods that are used in the selecting process; a belief state portion 534, which stores a belief state, such as that received through the communication module 590; and a sensor data portion, which stores sensor data collected from the environment, such as, for example, temperature measurements received from the I/O interface 520.

It should be appreciated that the memory 530 can be implemented using any appropriate combination of alterable, volatile or nonvolatile memory, or nonalterable or fixed, memory. The alterable memory, whether volatile or nonvolatile, can be implemented using any one or more of static or dynamic RAM, flash memory or the like. Similarly, the non-alterable or fixed memory can be implemented using any one or more of ROM, PROM, EPROM, EEPROM or the like.

As shown in FIG. 11, the one or more control and/or data busses and/or application programming interface 540 provide communication and data transfer among various ones of the circuits, routines or applications 560–580 of the selecting system 500. The controller 550 provides instructions to, and controls the interactions between, various ones of the circuits, routines or applications 560–580 of the selecting system 500.

In the selecting system 500 shown in FIG. 11, the belief state updating circuit, routine or application 560 updates the belief state based on the sensor data. The objective function evaluating circuit, routine or application 570 evaluates the objective function H. The next node selecting circuit, routine or application 580 selects, as a next node, a node that produces a desirable result for the objective function H.

In various exemplary embodiments of the operation of the selecting system 500 according to this invention, the current node that the selecting system 500 is a part of receives a query with a belief state from a querying node, and passes the query with updated belief state to a selected next node. To select that next node, the communication module 590 of the selecting system 500, under control of the controller 550, receives the query and the belief state from the querying node over the link 510 and stores the received query and belief state in the belief state portion 534. The objective function evaluating circuit, routine or application 570, under control of the controller 550, extracts one or more of neighbor information, such as one or more neighbor nodes and locations, from the neighbor portion 531; signal model information from the model portion 532; and criteria information from the criteria portion 533. Then, the objective function evaluating circuit, routine or application 570, under control of the controller 550, evaluates the objective function H for the extracted neighboring nodes.

The next node selecting circuit, routine or application 580, under control of the controller 550, selects, as a next node, the node that generates the desirable result for the objective function H. The belief state updating circuits, routine or application 560, under control of the controller 550, updates the belief state stored in the belief state portion 534 based on the sensor data at the node, and sends a report to the querying node through the communication module 590 and the link 510. The next node selecting circuit, routine or application 580, under control of the controller 550, further transmits the query stored in the belief state portion 534, along with the updated belief state, to the selected next node through the communication module 590 and the link 510.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. For example, the various embodiments describe methods that select ONE next sensor among the neighbors. However, it is evident that the optimization criterion can be applied to the selection of a group of next sensors, using the aggregate information gain and cost as the objective function. Various changes may be made without departing from the spirit and scope of the image.

What is claimed is:

1. A method for selecting a data routing path in a sensor network with a plurality of queried sensors and a plurality of unqueried sensors, comprising:
    determining a current belief state at a current sensor based on information obtained from the plurality of queried sensors;
    selecting a set of neighboring sensors from the plurality of unqueried sensors;
    determining at the current sensor an information utility function value that indicates an information quality for information obtained from each of the plurality of queried sensors, the indicated information quality based on a set of predefined information quality parameters;
    determining at the current sensor a cost function value that indicates at least one of power and bandwidth usage required to transmit information obtained from each of the neighboring sensors;
    determining at the current sensor a weighted sum of the information utility function value and the cost function value;
    applying the determined weighted sum to the selected set of neighboring sensors to select a next sensor from the selected set of neighboring sensors;
    determining a new belief state for the next sensor based on the current belief state and information obtained by the current sensor; and
    transmitting at least the new belief state to the next sensor.

2. The method according to claim 1, wherein each of the plurality of queried sensors and the plurality of unqueried sensors comprises one or more sensing devices, microprocessors, storage devices, and communication links.

3. The method according to claim 2, wherein the one or more sensing devices include one or more microphones, vibration sensors, photo cells, thermometers, cameras, magnetometers, infra-red sensors, chemical sensors and biological sensors.

4. The method according to claim 1, further comprising:
    transmitting a task query to the current sensor from a previous sensor;
    wherein:
    the task query comprises a request for information about a target located adjacent to at least one sensor;
    the information quality comprises a quality of information generated by the next sensor about the target; and
    the cost for obtaining the information quality comprises a cost of transmitting the obtained information quality to at least the next sensor.

5. The method according to claim 4, wherein transmitting the task query comprises wirelessly transmitting the task query.

6. The method according to claim 4, wherein transmitting the task query comprises transmitting the task query over a wired connection.

7. The method according to claim 4, further comprising transmitting the task query to the next sensor.

8. The method according to claim 4, further comprising transmitting multiple task queries to multiple sensors.

9. The method according to claim 8, wherein transmitting the multiple queries to the multiple sensors comprises transmitting the multiple queries to the multiple sensors substantially simultaneously.

10. The method according to claim 1, wherein transmitting the new belief state comprises transmitting a description about a physical phenomenon being monitored.

11. A method according to claim 10, further comprising updating a belief state based on sensor data at a local or remote sensor.

12. The method according to claim 11, further comprising transmitting the updated belief state to the next sensor.

13. The method according to claim 1, wherein the neighboring sensors are selected within a specific range.

14. The method according to claim 13, wherein the specified range is a communication distance.

15. The method according to claim 1, further comprising determining the information quality based on a reduction of a residual uncertainty for an estimation task.

16. The method according to claim 1, further comprising:
    determining the information quality based on an ability of the next sensor to perform a task; and
    determining the cost function value based on a resource cost for the next sensor to perform the task.

17. A method for creating a data routing path in a sensor network, the data routing path comprising a sequence of data path sensors selected from the sensor network, the method comprising:

determining a current belief state for a current sensor in the sequence of data path sensors, the current belief state providing an estimate of a target state for a target that the sensor network is monitoring and tracking based on information obtained from the sequence of data path sensors;

selecting a set of neighboring sensors from the sensor network not including the sequence of data path sensors, each of the neighboring sensors being within a specified range of the current sensor;

determining at the current sensor an information utility function value that indicates an information quality for data available to the current sensor from each of the neighboring sensors, the indicated information quality based on a set of predefined information quality parameters;

determining at the current sensor an energy conservation function value that indicates at least one of power and bandwidth usage required to transmit data between the current sensor and each of the neighboring sensors;

determining at the current sensor a weighted sum of the information utility function value and the energy conservation function value;

applying the determined weighted sum to each of the neighboring sensor to generate a set of evaluation results;

adding a next sensor to the sequence of data path sensors, wherein the next sensor is selected from the selected set of neighboring sensors based on the set of evaluation results;

determining a new belief state for the next sensor based on the current belief state and information obtained by the current sensor; and transmitting at least the new belief state to the next sensor.

18. A network comprising a plurality of sensors, each of the plurality of sensors comprising:

an objective function evaluating circuit, routine or application;

a next sensor selecting circuit, routine or application; and a memory which stores neighboring sensor information and evaluation information for evaluating information gain and cost associated with data routing, wherein:

the objective function evaluating circuit, routine or application determines a current belief state at a current sensor based on information obtained from a plurality of queried sensors, selects a set of neighboring sensors from a plurality of unqueried sensors, determines at the current sensor an information utility function value that indicates an information quality for information obtained from each of the plurality of queried sensors, the indicated information quality based on a set of predefined information quality parameters, determines at the current sensor a cost function value that indicates at least one of power and bandwidth usage required to transmit information obtained from each of the neighboring sensors, and determines at the current sensor a weighted sum of the information utility function value and the cost function value; and the next sensor selecting circuit, routine or application applies the determined weighted sum to the selected set of neighboring sensors to select a next sensor from the selected set of neighboring sensors, determines a new belief state for the next sensor based on the current belief state and information obtained by the current sensor, and transmits at least the new belief state to the next sensor.

19. The network according to claim 18, wherein the next sensor selecting circuit, routine or application further transmits a query to the selected next sensor.

20. The network according to claim 19, each of the plurality of sensors further comprising a belief state updating circuit, routine or application, wherein:

the query is associated with a belief state regarding a target;

the belief state updating circuit, routine or application updates the belief state based on the selected next sensor; and the next sensor selecting circuit, routine or application transmits the updated belief state and the query to the selected next sensor.

21. The network according to claim 18, wherein the neighboring sensor information stored in the memory is information only about sensors within a specified neighboring range of the current sensor.

22. The network according to claim 21, wherein the specified range is a specified communication distance.

23. The network according to claim 18, wherein the information quality comprises a quality of information generated by the next sensor about a target.

24. The network according to claim 18, wherein the information quality comprises an ability for the next sensor to perform a task specified in a query, and the cost includes a resource cost for the next sensor to perform the task.

25. The network according to claim 18, wherein two queries are sent to two sensors simultaneously.

* * * * *